J. E. WILLIAMS.
VALVE MECHANISM.
APPLICATION FILED AUG. 15, 1911.

1,020,003.

Patented Mar. 12, 1912.

WITNESSES
L. Cloud Newman
H. F. Rueth

INVENTOR
James Edward Williams
by A. Ulberg
Attorney

UNITED STATES PATENT OFFICE.

JAMES EDWARD WILLIAMS, OF BESSEMER, ALABAMA.

VALVE MECHANISM.

1,020,003.  Specification of Letters Patent.  Patented Mar. 12, 1912.

Application filed August 15, 1911. Serial No. 644,236.

*To all whom it may concern:*

Be it known that I, JAMES EDWARD WILLIAMS, a citizen of the United States, residing at Bessemer, in the county of Jefferson and State of Alabama, have invented certain new and useful Improvements in Valve Mechanism, of which the following is a specification.

This invention relates to certain new and useful improvements in valve mechanism, and relates particularly to that type of valve mechanism used in connection with direct acting engines such as are employed in connection with the operation of rock drills, coal punching machines, power operated hammers, and the like.

The invention has for its object the provision of valve mechanism of the character stated in which comparatively little travel is required for the valve to fully open the ports for the admission to the cylinder of the power fluid, and in which the valves are disposed at right angles to the longitudinal axis of the cylinder.

A still further object of the invention is to provide a valve mechanism of this character in which the valves are operated to move the same to open position by direct contact with the piston, thereby insuring at all times a quick and positive movement of the valve to its open position.

The invention comprises, generally stated, a piston having inclined faces thereon together with a power fluid chest in which two vertically movable valves are disposed, connected together within the chest by a rocking or tilting lever, the valves extending at their lower ends through the chest and provided on said lower ends with inclined surfaces engageable with the inclined surfaces of the piston whereby the latter in its reciprocating movement alternately raises the valves so as to open and close the ports leading to the cylinder.

Figure 1:
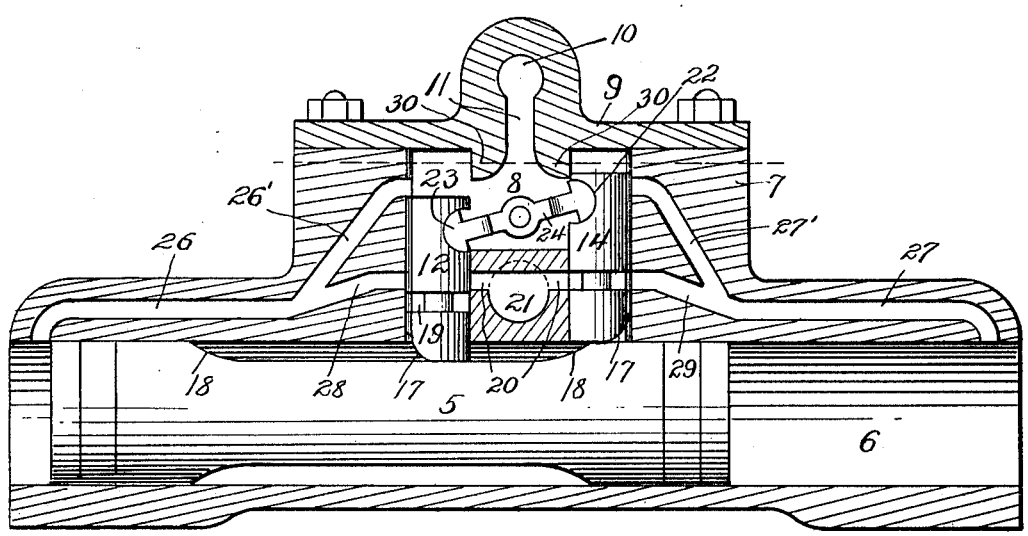
Figure 2:
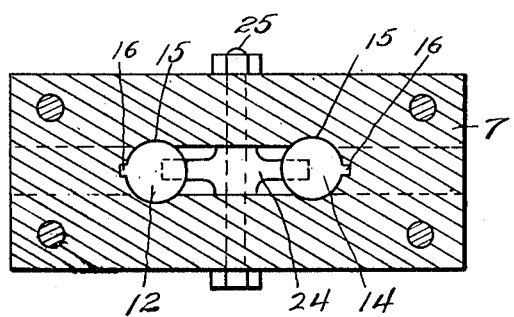

In the accompanying drawings, Figure 1 is a longitudinal sectional view of my improved valve mechanism, and Fig. 2 is a horizontal sectional view of the same.

Like reference numerals indicate like parts in each of the figures.

I have shown the piston 5 as mounted within a cylinder 6, shown with both ends open, though it will of course be understood that one end will be suitably closed, and the other end will have a suitable inclosure through which the rod of the piston will extend and work.

The device it will be understood may be operated with either steam, air, or any other suitable power fluid.

The power fluid chest 7 may be of any approved shape, the chamber 8 thereof being closed at its outer end by a plate 9 through which extends the inlet opening 10, the motive fluid passing from the inlet opening 10 to the chamber 8 through the passage-way 11 provided therefor. In the chamber 8 of the chest are mounted two valves 12 and 14 respectively movable at right angles to the longitudinal axis of the cylinder. These valves are substantially of the spool type, and work in ways or seats 15 provided therefor in the walls of the chamber 8, and are preferably provided with the guides 16 extending longitudinally of the valves and sliding in grooves provided therefor in the walls of the chamber as clearly shown in Fig. 2 of the drawings.

The ways 15 open into the cylinder 6, and each valve at its inner end is provided with an inclined face 17 which faces are engaged by the inclined faces 18 provided on the piston 5. The valves intermediate their ends are provided with circumferential grooves 19 forming passage-ways which lead, when the valves are open, through ports 20 to the exhaust port 21 leading from the chest 7. The valves near their outer ends are provided on their confronting faces with seats 22 which receive the headed end 23 of a rocking or tilting lever 24 mounted to rock on a bolt 25 extending transversely through the chest 7.

The chest 7 has the main ports 26, 27 respectively leading to the cylinder at opposite sides of the piston 5. Branch passages 26', 27' lead into the chamber 8, and branch passages 28, 29 respectively lead to the annular grooves 19 and ports 18, to the exhaust 21.

The cover plate 9 of the chest is provided on its inner face with flanges 30 which project into the chest a distance sufficient so that when either valve is in the opened position, it will slightly overlap the confronting face of the adjacent flange, and thus close off the space above the valve from the motive fluid.

The operation of my improved valve mechanism it is thought will be readily understood, by those skilled in the art, since it will be evident that when air, steam, or other motive fluid employed is admitted to the chamber 8, and with the parts in the position as shown in Fig. 1, the motive fluid will pass from the chamber 8 through ports 26' and 26 into the cylinder 6 at the left hand end of the piston 5, so that the piston will be moved toward the opposite end of the cylinder. When such movement takes place, the inclined face 18 at the left hand end of the cylinder engages with the inclined face 17 of the valve 12, and the support for valve 14 having been removed due to the movement of the piston, valve 12 is shifted outwardly, and valve 14 shifted inwardly. The outward movement of valve 12 shuts off the supply of motive fluid through port 26', and communication is established between the cylinder at the left hand end of the piston and the exhaust 21 through port 26 and branch port 28. Valve 14 having been moved inwardly, communication is thus established from the chamber 8 through port 27' and port 27 with the cylinder at the right hand end of the piston so as to force the piston in the opposite direction. On this latter movement, the valves will again assume the position shown in Fig. 1 and motive fluid is again admitted to the cylinder at the left hand end of the piston.

It is to be noted that the movement of the valves is effected by positive engagement with the piston, and that when it is desired to have access to the chamber 8 for any purpose whatever, the removal of plate 9 carries with it the projections or flanges 30, so that when the bolt 25 is removed the valves together with the rocking lever may be lifted out and cleaned or repaired as may be desired.

I do not limit myself to the particular construction herein shown and described, as this may be varied without departing from the spirit of my invention.

Having fully described my invention, what I claim is:

In a valve mechanism of the type described, the combination with a cylinder, a piston therein provided with inclined faces, a fluid receiving chest, and inlet ports leading from the chamber in the chest to the cylinder at opposite ends of the piston, of a pair of valves mounted within the chamber of said chest and movable therein at right angles to the longitudinal axis of the cylinder, said valves having inclined inner ends projecting into the cylinder to be engaged by the inclined faces of said piston, said valves intermediate their ends having peripheral grooves and the chest wall having branch ports in constant communication with the inlet ports and with which the grooves are brought into registry as the valves are operated, a rocking lever mounted within the chamber of the chest and having its ends seated to work in recessed confronting faces of the valves, and a cover plate for the chest.

In testimony whereof I affix my signature in presence of two witnesses.

JAMES EDWARD WILLIAMS.

Witnesses:
  GEORGE ROSS,
  JIM. ROSS.

---

Copies of this patent may be obtained for five cents each, by addressing the "Commissioner of Patents Washington, D. C."